US007429303B2

(12) United States Patent
Ravat

(10) Patent No.: US 7,429,303 B2
(45) Date of Patent: Sep. 30, 2008

(54) DEVICE FOR WINDING A CYLINDRICAL SLEEVE AROUND A TORIC RING

(75) Inventor: Stéphane Ravat, Clermont (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 366 days.

(21) Appl. No.: 11/191,289

(22) Filed: Jul. 28, 2005

(65) Prior Publication Data

US 2006/0021694 A1 Feb. 2, 2006

(30) Foreign Application Priority Data

Aug. 2, 2004 (FR) .................................. 04 08556

(51) Int. Cl.
*B29D 30/32* (2006.01)

(52) U.S. Cl. ........................ 156/132; 156/135; 156/400; 152/552

(58) Field of Classification Search ................. 156/132, 156/135, 400–402, 421.4, 460; 152/552
See application file for complete search history.

(56) References Cited

U.S. PATENT DOCUMENTS

| 3,486,958 | A | | 12/1969 | Von Waldeck et al. | |
| 3,654,007 | A | * | 4/1972 | Winstanley et al. | ......... 156/132 |
| 4,450,025 | A | * | 5/1984 | Henley | ......................... 156/132 |
| 4,561,919 | A | * | 12/1985 | Forsyth | ....................... 156/460 |
| 5,651,849 | A | * | 7/1997 | Pizzorno | ....................... 156/132 |
| 2002/0007917 | A1 | | 1/2002 | Cordaillat et al. | |
| 2003/0037856 | A1 | | 2/2003 | Kato et al. | |

FOREIGN PATENT DOCUMENTS

| DE | 12 68 372 B | 5/1968 |
| FR | 1 485 919 A | 6/1967 |
| FR | 1 490 230 A | 7/1967 |

* cited by examiner

*Primary Examiner*—Geoffrey L Knable
(74) *Attorney, Agent, or Firm*—Cohen Pontani Lieberman & Pavane LLP

(57) ABSTRACT

Device (D) for winding a cylindrical sleeve (C) of axis XX' around a toric ring (R) so that the end (E) of the said cylindrical sleeve is engaged between the toric ring (R) and the cylindrical sleeve (C) itself in order to make at least one complete turn around the substantially circular radial section of the said toric ring (R). The device comprises a winding fabric (T) also formed by a sleeve sliding freely in the axial direction on the external surface of a concentric set of winding heads (10, 10') having an external profile comprising a back (104) constituting a substantially cylindrical surface, a convex front annular surface (102) connected to the previous surface and a concave annular surface (103) connected to the latter so that the winding fabric (2) produces S-shaped loops when the said winding fabric (T) substantially follows the radial profile of the convex annular surface (102) and of the concave annular surface (103) of the winding heads (10, 10').

7 Claims, 6 Drawing Sheets

DEVICE FOR WINDING A CYLINDRICAL SLEEVE AROUND A TORIC RING

FIELD OF THE INVENTION

The invention concerns the manufacture of tires, more particularly a method and device for manufacturing tire blanks comprising special beads.

BACKGROUND OF THE INVENTION

A tire usually comprises beads extended by sidewalls, the latter being joined by a crown ring itself surmounted radially on the outside by a tread.

This type of tire comprises a carcass reinforcement extending in the side walls and anchored in the beads, the said carcass reinforcement being formed by at least one stack of reinforcing elements substantially parallel to each other and coated with at least one rubber composition. Stack means either a ply formed in advance by calender-coating reinforcing elements between two layers of a rubber mix or a composite formed from a plurality of reinforcing elements coated in a rubber mix. The reinforcing elements can consist of wires or textile or metallic cords.

Tire beads, intended to be in abutment on the tire mounting rim, comprise a reinforcement ring for the bead disposed concentrically with the axis of rotation of the tire. This reinforcement ring serves for anchoring the carcass reinforcement. It is in general formed from a bead wire coated with a rubber mix to form a composite structure with a round cross section. A bead wire is a body formed from one or more reinforcing elements disposed so as to confer on the said structure a circumferential extension rigidity sufficient to take up the forces created in the carcass reinforcement by the inflation of the tire. The said bead wire may or may not have a round transverse section.

Whether the bead wire has a round section or not, it is usual to coat this bead wire with at least one rubber mix so as to obtain a toric ring with a round section.

In the most common tires, the carcass reinforcement is anchored on each reinforcement ring of the bead by partial coupling around the said ring in order to form an upturn extended radially upwards and coupled with the carcass reinforcement by at least one rubber mix.

The structure thus formed (carcass reinforcement, upturn and coupling mix) has high stiffness in flexure. However, this structure has sensitivity to breaking at the end of the upturn because of the position of the said end in a region of more or less strong flexure.

To reduce this sensitivity, it has been sought to put the end of the carcass reinforcement outside the flexure zone, by putting it in the tire sidewall or even under the crown.

This is also the reason why it has been proposed to develop tire bead structures not having an upturn end of the carcass reinforcement in the flexure zones (or more generally in the movement zones) of the tire.

In this type of solution, the upturn of the carcass reinforcement partially or completely surrounds the bead reinforcement ring.

The document EP 1 066 992 describes an architecture in which the end of the upturn of the carcass reinforcement partially surrounds the reinforcement ring of the bead so that its end is situated radially outside the said reinforcement ring.

Another type of construction of these tires is characterized by the fact that the carcass reinforcement is wound around the reinforcement ring of the bead so that the end of the said reinforcement is engaged between the reinforcement ring of the bead and the carcass reinforcement itself in order to make at least one complete turn of the said reinforcement ring of the bead. This particular arrangement also has the advantage of optimising the mechanical anchoring of the carcass reinforcement on the reinforcement ring of the bead.

However, producing these structures is tricky because of the difficulty of making the reinforcing elements of the carcass reinforcement take pronounced curvatures because of their return elasticity, normally described by the term "snappiness".

An object of the invention concerns a device for producing this type of tire industrially, the elements of the method related to the use of this device.

The prior art concerning a method able to produce a tire close to the type described above is disclosed by way of example in the publication EP 1 024 033. This document reports on the possibility of engaging the end of the cylindrical sleeve between the reinforcement ring of the rim and the carcass reinforcement. This means remains limited by the fact that, during the implementation of this method, it is not possible to make the said carcass reinforcement make a complete turn around the reinforcement ring of the bead; the number of turns being counted on the inside diameter of the said reinforcement ring of the bead as the number of passages of the said carcass reinforcement stack minus one unit.

Moreover, so as to combat the "snappiness" of the reinforcing elements when these consist of metallic cables, EP 1 024 033 proposes to break the said reinforcement by applying a heavy rolling on the areas of the reinforcement intended to be subjected to the greatest curvature. It is nevertheless sought to avoid such an operation because of the localised plastic deformations that it causes the metallic reinforcing elements to undergo, which may be prejudicial to their endurance.

SUMMARY OF THE INVENTION

One object of the invention is a device and method implementing the said device, intended for the manufacture of tires comprising beads, in at least one of which the carcass reinforcement is wound around the reinforcement ring of the bead, so that the end of the said carcass reinforcement is engaged between the reinforcement ring of the bead and the carcass reinforcement itself in order to make at least one complete turn of the said reinforcement ring of the bead.

More generally the carcass reinforcement can be assimilated to a cylindrical sleeve, and the reinforcement ring of the bead to a toric ring.

Under these conditions the invention concerns a device for winding one end of a cylindrical sleeve of axis XX' around a toric ring with an inside diameter substantially equal to that of the cylindrical sleeve, so that the end of said cylindrical sleeve will engage between the toric ring and the cylindrical sleeve itself in order to make at least one complete turn around the substantially circular radial section of the said toric ring.

This device comprises a winding fabric, also formed by a sleeve sliding freely in the axial direction of the external surface of a concentric set of winding heads having an external profile comprising a back constituting a substantially cylindrical surface of axis XX', a convex front annular surface of axis XX' connected to the preceding surface, and a concave annular surface of axis XX' situated at the rear of the convex annular surface and connected to the latter.

The two ends of the sleeve formed by the winding fabric are fixed to the periphery of two concentric circular anchoring plates of axis XX', and situated on each side of the winding heads.

When it is pressed against the surface formed by the set of winding heads, the winding fabric produces S-shaped loops. This particular form of the surface of the winding heads enables the winding fabric to form a loop constituting an annular housing intended to grip the toric ring and the cylindrical sleeve.

According to this device, the winding of the cylindrical sleeve around the toric ring is driven by the relative axial movement, with respect to the winding heads, of the winding fabric gripping the toric ring and the cylindrical sleeve over part of the circumference of the assembly formed by the said toric ring and the said cylindrical sleeve wound around it.

The relative movement of the winding fabric around the toric ring is caused by the axial movement of the winding heads between the said anchoring plates, the said movement drawing in the same axial movement the assembly formed by the said toric ring and the said cylindrical sleeve wound around it. This movement could just as well be the resultant of the axial movement of the anchoring plates with respect to the winding heads.

Such a device makes it possible to produce tire lengths comprising beads, in at least one of which the carcass reinforcement is wound around the reinforcement ring of the bead, so that the end of the said carcass reinforcement is engaged between the reinforcement ring of the bead and the carcass reinforcement itself in order to make at least one complete turn of the said reinforcement ring of the bead without it being necessary to deform the carcass reinforcement in advance.

The description that follows will set out to describe a particular embodiment of a device according to the invention as well as the method of using the device that is the object of the invention.

BRIEF DESCRIPTION OF THE DRAWINGS

The characteristics of the invention will emerge from the description given below with reference to the diagrams and drawings which show, non-limitingly, an embodiment of a device according to the invention and in which.

DETAILED DESCRIPTION OF THE DRAWINGS

The identical elements of those having a similar function will bear the same number or the same reference letter.

The axis of the device is located along XX' and the references considered and the movements made in this direction will be termed axial. A radial direction is a direction perpendicular to the axis XX', and the references considered or the movements made in this direction will be termed radial.

Figure 1:
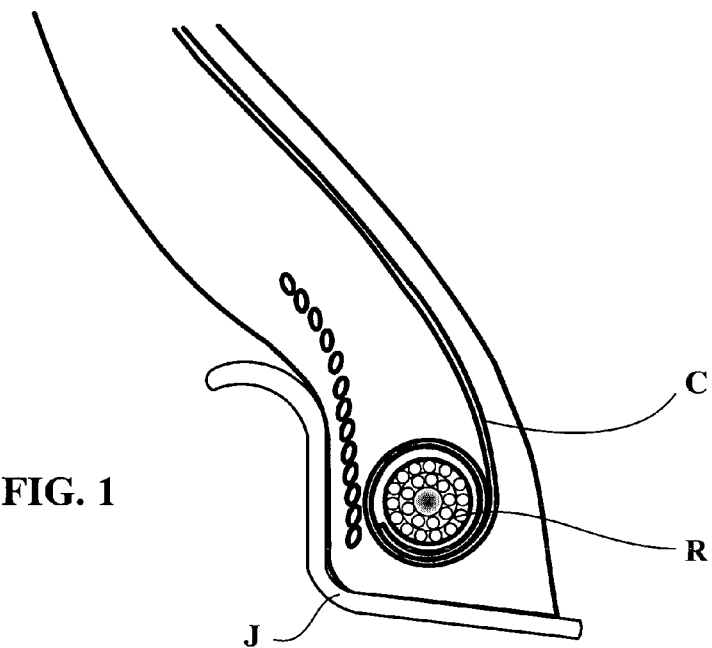
FIGS. 1 and 2 depict views in schematic section of a tire having structures that it is possible to produce with the device that is the object of the invention.
Figure 2:
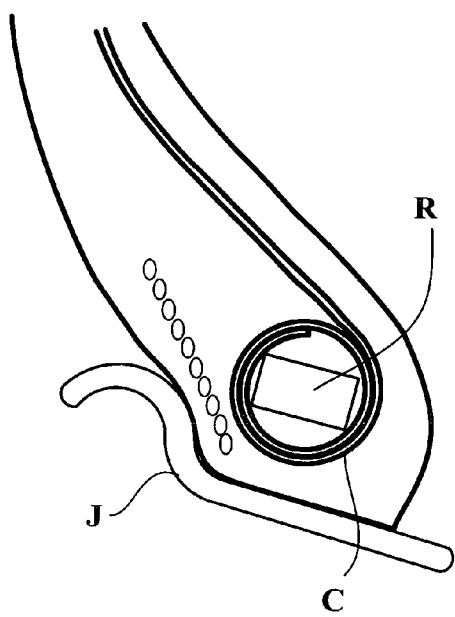

FIGS. 1 and 2 show views in schematic section of tires, positioned on a rim J, in which the carcass reinforcement is wound around the reinforcement ring of the bead R so that the end of the carcass reinforcement C is wound between the toric reinforcement ring of the bead R and the carcass reinforcement C itself in order to make at least one complete turn of the said reinforcement ring of the bead. It goes without saying that the method also makes it possible to produce tires in which the carcass reinforcement C makes less than a complete turn around the reinforcement ring of the bead R.

The toric reinforcement ring of the bead R is itself formed from at least one bead wire (that is to say at least one cord or a cable or assembly of cords or cables forming a continuous circumferential structure and having great rigidity in extension) with a meridian section that may, in particular but not exclusively, be circular or rectangular.

Thus FIG. 1 shows a section through a tire bead whose bead reinforcement ring is a bead wire of circular section; FIG. 2 shows a section through a tire with a bead wire of substantially rectangular section and coated in a profile having a substantially circular external shape. For ease of implementation of the method, the choice of a bead wire with a circular section will nevertheless be preferred.

Figure 3:
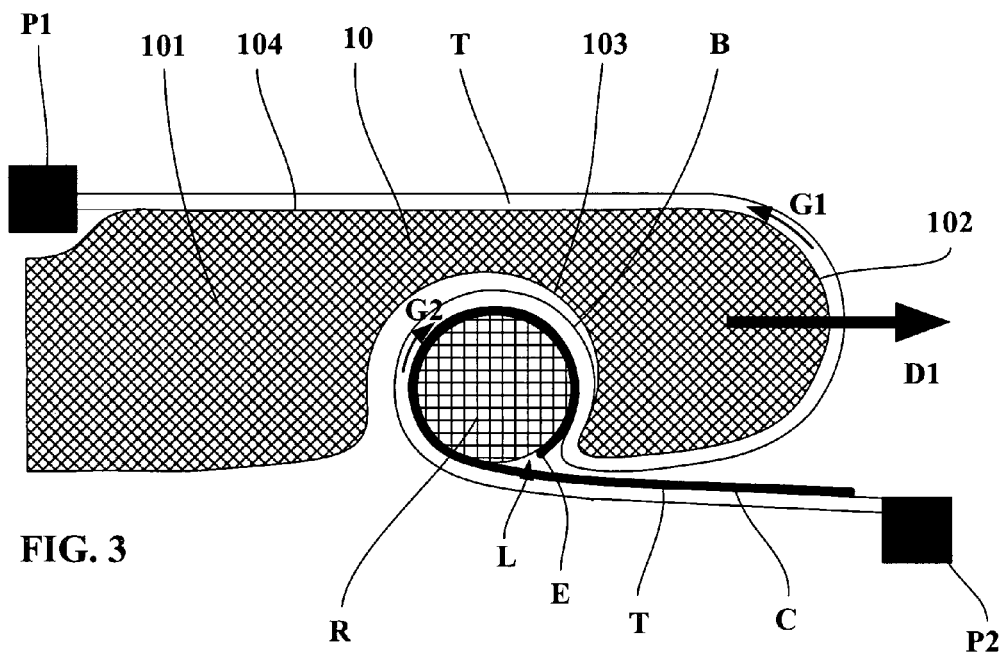
FIGS. 3 and 4 depict diagrams in section describing the principle of functioning of the device that is the object of the invention.
Figure 4:
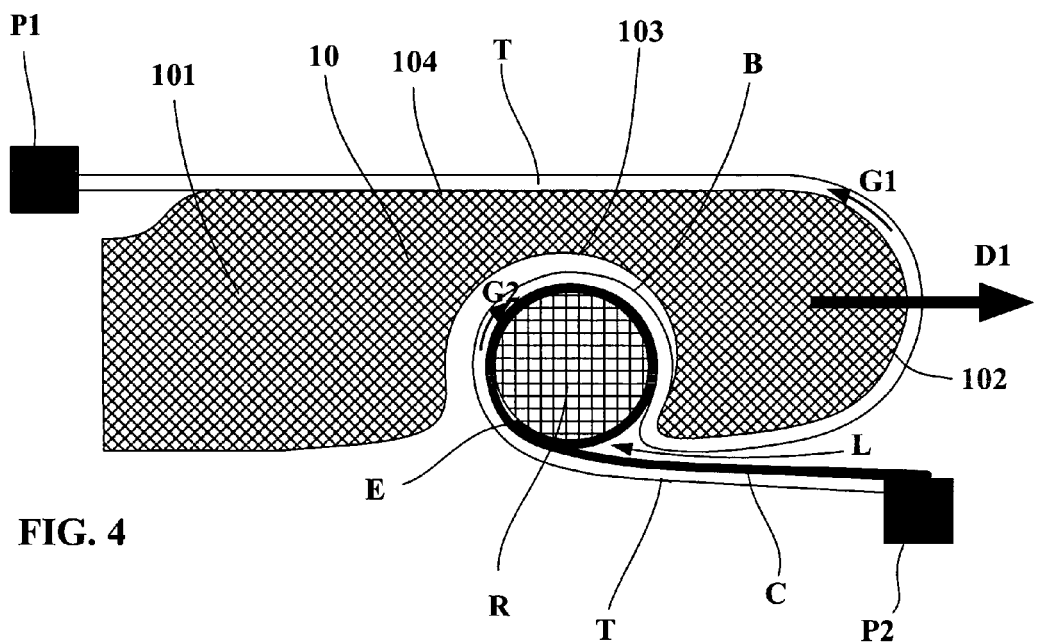

The principle of functioning of a device according to the invention is displayed in FIGS. 3 and 4, in which the winding fabric T, depicted in meridian section, is fixed by its two ends at P1 and P2 situated on the periphery of the anchoring plates (not shown).

The winding head 10 is positioned axially between P1 and P2 and can move axially in the direction of D1. It is delimited by external surfaces that comprise:

a substantially rectilinear back 104 forming a cylindrical surface of axis XX', a convex part 102 connected to the previous surface, forming an annular surface of axis XX' and situated at the front of the winding head axially closest to P2, and a concave part 103, forming a concave annular surface of axis XX', connected to the convex annular surface and situated at the rear of the latter.

The axis XX' is not depicted in FIGS. 3 and 4 for reasons of scale and clarity but appears clearly in the following figures:

The body 101 of the winding head is intended to be connected to the mechanisms (not shown) controlling the movements of the winding head 10.

The winding fabric T can slide freely on the back 104, the convex part 102 and the concave part 103 of the winding head when it is put in contact with the said surfaces. In this configuration, the winding fabric T takes an S shape and forms a loop B enclosing an annular housing L.

To effect the winding of the cylindrical sleeve C around the toric ring R it is necessary to introduce these two constituents into the said annular housing L.

By moving the winding head 10 and the assembly formed by the toric ring R and cylindrical sleeve C in the axial direction D1, a relative sliding of the winding fabric T is created along the surface of the winding head, in the direction G1. The winding fabric T then makes a circular movement around the toric ring R, which has the effect of causing the winding of the end E of the cylindrical sleeve C around the said toric ring R.

It is possible to precisely adjust the number of winding turns of the cylindrical sleeve around the toric ring of the bead, determining accordingly the length of the axial movement of the winding head.

It will be observed that the winding of this cylindrical sleeve C around the toric ring R is effected by sliding the surface of the cylindrical sleeve C over the external surface of the toric ring R. To this end it is essential to reduce as far as possible the friction between these two surfaces by any appropriate means.

Thus, by way of example, it is possible to provide for the use of stearate powder or to surround the toric ring with a metallic or textile filament disposed in a spiral, or make use of a sheath of thermoplastic material disposed around the toric ring. In the latter case, and if it is a case of a tire, arrangements will be made for this thermoplastic material to be able to be integrated in the structure of the bead and with the adjacent rubber profiles at the time of the vulcanisation step.

Moreover, the winding of the cylindrical sleeve and the engagement of its end E under the toric ring can be facilitated further by axially extending outwards the end of the main cylindrical sleeve by a portion of cylindrical sleeve produced from a material having less "snappiness" than the material making up the main cylindrical sleeve proper. This extension is used to drive the end of the main cylindrical sleeve by forming an initiation zone thus facilitating the winding of the main cylindrical sleeve C around the toric ring R. It is preferentially composed of a flexible reinforcement material, that is to say one having great flexibility or suppleness under curvature.

It will also be noted that, in order to ensure satisfactory driving by the winding fabric T of the cylindrical sleeve C around the toric ring, it is preferable to put the fabric T under tension by applying axial forces in opposite directions on the anchoring plates supporting the anchoring points P1 and P2.

However, this tensioning of the winding fabric T could have the consequence of causing the radial compression of the toric ring and, in some cases, the exit of the annular housing L from the assembly formed by the toric ring R and cylindrical sleeve C. To avoid this phenomenon it is necessary to design the respective shapes of the convex 102 and concave 103 surfaces so that the fabric can surround the assembly formed by the toric ring R and cylindrical sleeve C on at least half of its circumference; the functioning of the device being all the more easy to implement when the winding fabric T surrounds this assembly over the widest part of the circumference of the said assembly.

The diameter of the anchoring plates supporting the anchoring points P1 and P2 of the ends of the winding fabric T must also be adjusted so that the anchoring points P1 are disposed substantially at the same radius as the back 104, and the anchoring points P2 are disposed substantially at the same radius as the internal radius of the toric ring R. The purpose of this arrangement is to keep the axial distance between the anchoring points P1 and P2 substantially constant during the axial movement of the winding head 10. In practice it is necessary to choose a plate supporting the anchoring points P2 with a radius slightly less than that of the internal radius of the toric ring, so as to allow the axial introduction of the assembly formed by the cylindrical sleeve C and toric ring R in the housing L.

The winding fabric T is formed from materials conferring suitable axial elasticity on it, and in practice as low as possible, and a circumferential elasticity enabling it to pass from a diameter equal to the inside diameter of the toric ring R to the diameter of the cylinder formed by the surface of the backs 104 without undergoing any degradation. This is because it is necessary for the winding fabric to be able to follow the axial profile of the winding head 10 during the axial movement of the latter without making any folds.

It will be remarked that the device D described above makes it possible to effect the winding of a cylindrical sleeve C with a diameter substantially equal to the inside diameter of a toric ring R. Under these conditions the winding heads 10, 10' are disposed so that the cylindrical surface forming the back (104) is situated on the part of the said winding heads 10, 10' radially furthest away from the axis XX'.

It is however entirely possible to envisage producing the winding of a cylindrical sleeve C around a toric ring R such that the diameter of the cylindrical sleeve is substantially equal to the outside diameter of the toric ring. It is then necessary to reverse the orientation of the winding heads and to configure them so that the cylindrical surface forming the back 104 is situated on the part of the said winding heads 10, 10' radially closest to the axis XX'.

Figure 5:
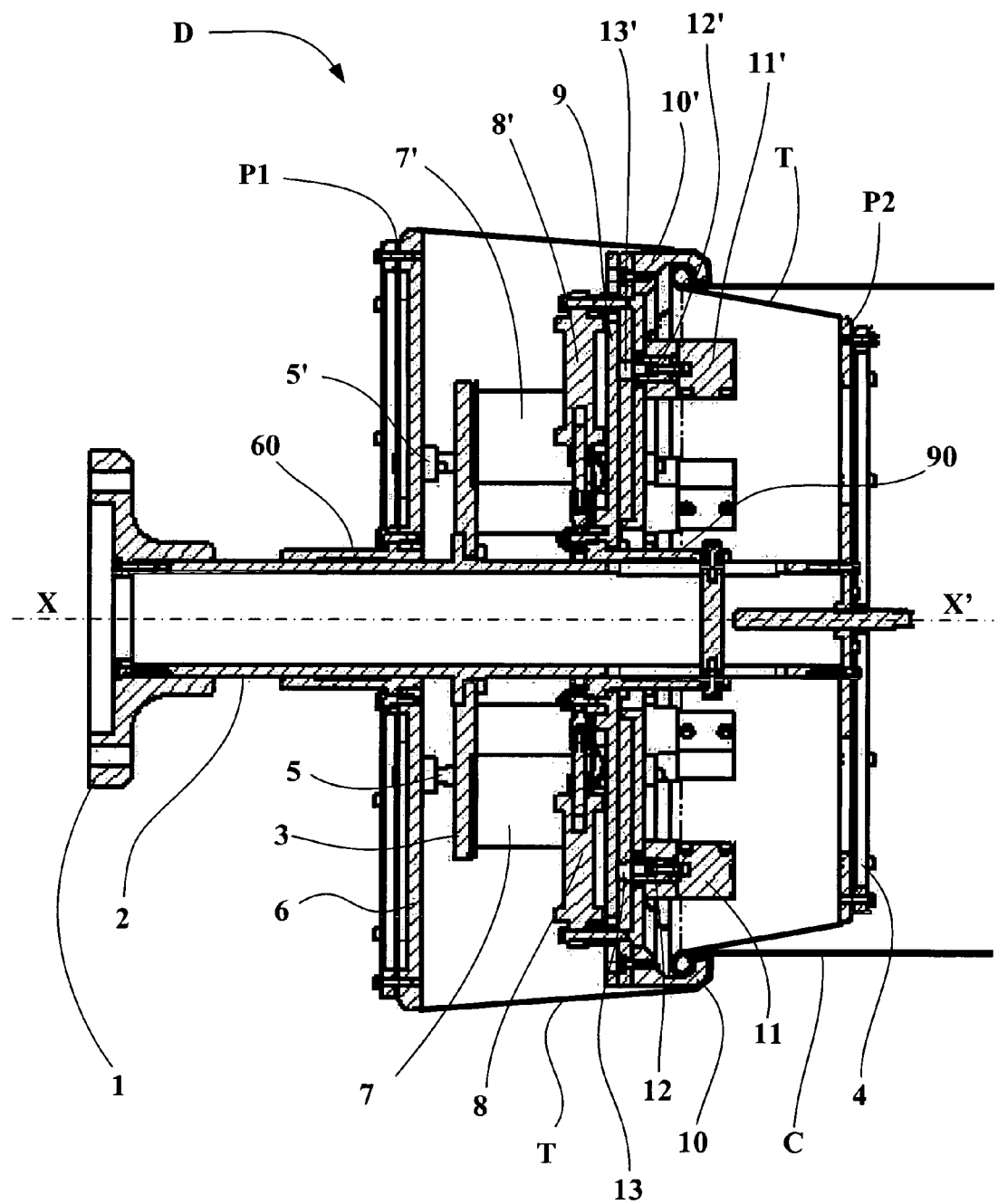
FIG. 5 depicts a view in section of a device according to the invention.

FIG. 5 displays a view in section of a device D according to the invention.

A shaft 2, of axis XX', connected by a flange 1 to a frame (not shown) carries a distinct assembly of circular plates centred on the axis XX'.

The device D comprises two fixed plates 3 and 4 and two moving plates 6 and 9. Starting in the axial direction of the flange 1 there are disposed successively the moving plate 6, then the fixed plate 3, the moving plate 9 and finally the fixed plate 4 axially furthest away from the flange 1. The moving plates 6 and 9 slide on the shaft 2 by means of sliding rings, respectively 60 and 90.

The winding fabric T forms a sleeve, the two axial ends P1 and P2 of which are fixed to the periphery of two circular anchoring plates 4 and 6 whose diameters substantially correspond respectively to the inside diameter of the toric ring R and to the diameter of the cylinder formed by the backs 104 of the winding heads.

The fixed plate 3 carries a first set of pneumatic cylinders 5, 5' allowing the axial movement of the moving plate 6. The object of this first set of cylinders is to maintain a constant axial tension on the winding fabric T tensioned between the plates 6 and 7.

A second set of cylinders 7, 7' is disposed on the fixed plate 3 and allows the axial movement of the moving plate 9.

The moving plate 9 carries at its periphery the set of winding heads 10, 10' consisting of a set of circumferential fragments of the annular surfaces 104, 102 and 103 as described previously.

The winding heads 10, 10' are able to move radially between two positions comprising a first so-called open position so as to allow the introduction and extraction of the cylindrical sleeve C and toric ring R, and a second so-called closed position in which the concave parts are disposed so as to trap in the annular housing L the assembly formed by the cylindrical sleeve C and the toric ring R.

The number of winding heads, at a minimum greater than or equal to 2, is determined by the amplitude necessary for the radial movement between the open and closed positions. In practice it seems that it is sufficient to form the annular surfaces from three circumferential fragments.

It will be noted that, in the closed position, the shape of the convex annular surface is adapted to receive the winding fabric T, and the toric ring R around which the cylindrical sleeve C winds. It is necessary to provide a form with an internal volume sufficient to allow the effects related to the increase in the size of this assembly when the number of winding turns of the cylindrical sleeve C around the toric ring R increases.

The radial movement of the winding heads 10, 10' is controlled by a set of pneumatic cylinders 8, 8' disposed on the plate 9.

So as to prevent any radial movement of the winding heads 10, 10' in the closed position, a locking device is also disposed on the plate 9. This locking device comprises a set of pneumatic cylinders 11, 11' controlling the axial movement of a set of locking fingers 12, 12' entering apertures 13, 13' aligned axially with the locking fingers 12, 12' when the winding heads are in the closed position.

An automatic controller controls the movements of these various components, the functionalities of which will easily be understood by detailing the various phases of the method of using the device D described above.

A first part of the method consists of producing the cylindrical sleeve.

In the case of a tire this sleeve can be composed, non-limitingly, of a carcass reinforcement and bead reinforcement rings. This operation takes place on a conventional building drum known to persons skilled in the art and consists of:
- depositing on the cylindrical surface of a building drum a carcass reinforcement C in the form of a ply having two axial ends and comprising at least one stack formed by a plurality of reinforcing elements coated with a rubber composition,
- slipping reinforcement toric rings of the bead R, concentrically with the carcass reinforcement C, onto the building drum and placing them at appropriate distances with respect to the ends E of the cylindrical sleeve formed by the carcass reinforcement C; the part of the cylindrical sleeve situated axially between the said toric reinforcement rings of the bead R constituting the middle part of the said sleeve,
- extracting the cylindrical sleeve thus produced from the building drum.

The carcass reinforcements can equally well consist of reinforcing elements forming an angle of less than or equal to 90° with the circumferential direction.

Figure 6:
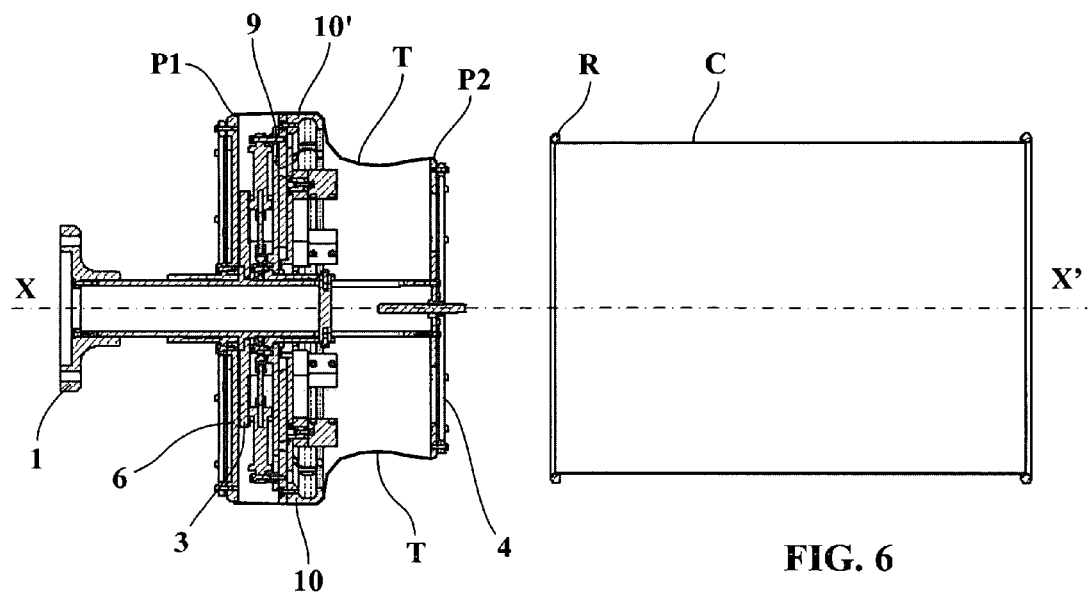
FIGS. 6 to 11 depict the principal steps of the method implementing the device that is the object of the invention.
Figure 7:
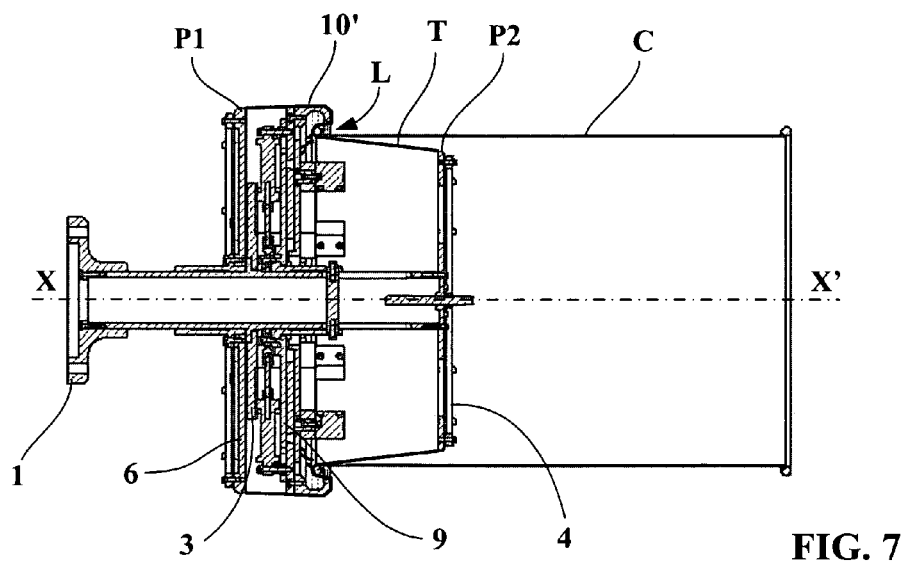
Figure 8:
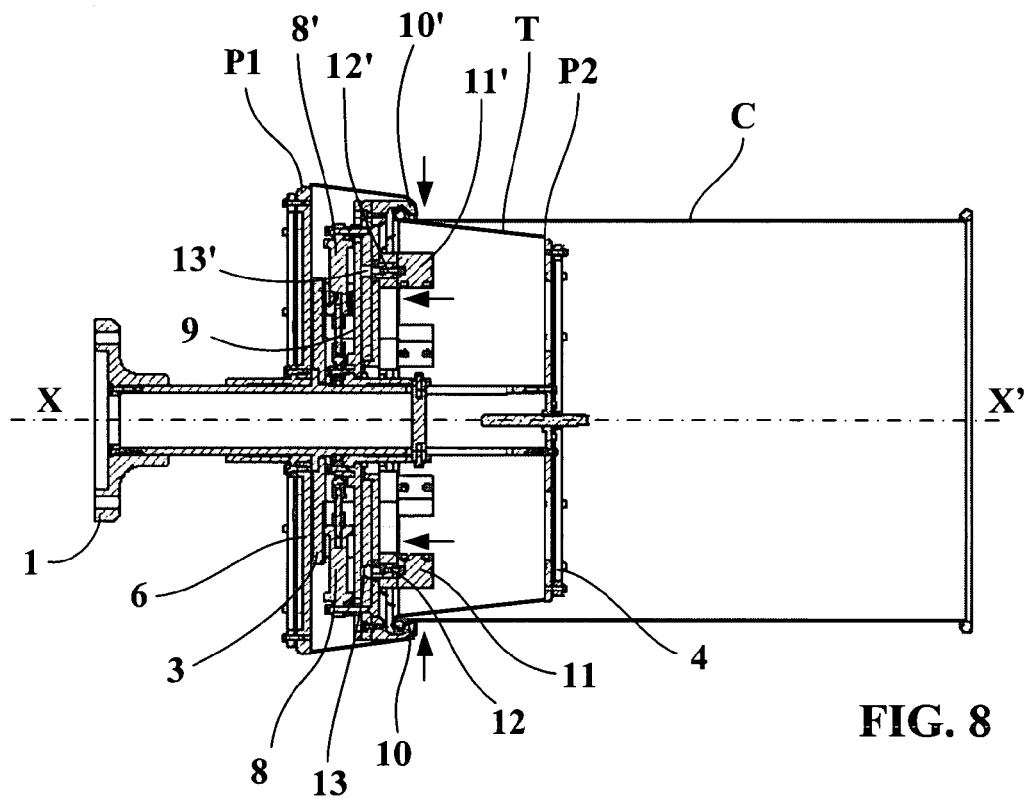
Figure 9:
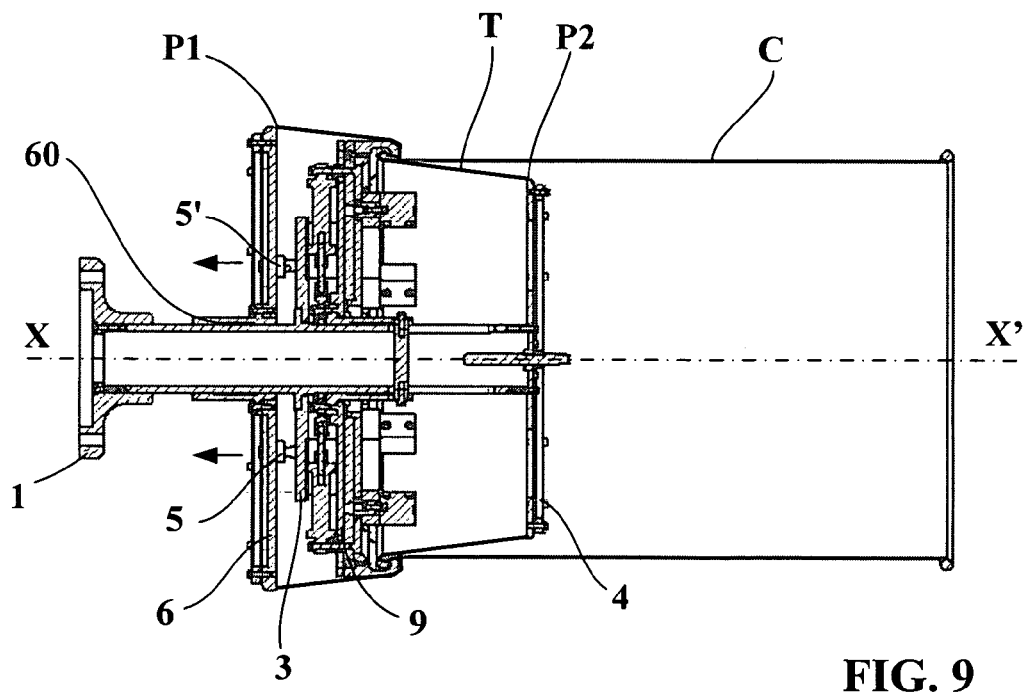

The second part of the process takes place using the winding device D as described previously and comprises the following steps:
- offering up and introducing the toric ring R and one of the two ends E of the cylindrical sleeve C in the winding device D, disposing the assembly inside the annular housing L formed by the winding fabric T, as depicted schematically in FIGS. 6 and 7;
- radially lowering the winding heads 10, 10' by actuating the cylinders 8, 8' (see FIG. 8) so that the winding fabric 10 surrounds the assembly formed by the toric ring R and the cylindrical sleeve C over more than half of the circumference of the said assembly, and so that the winding heads form substantially continuous cylindrical 104, convex 102 and concave 103 annular surfaces,
- locking the winding heads 10, 10' by actuating the cylinders 11, 11', as depicted in FIG. 8, the arrows disposed alongside each of these components making it possible to view the direction of the movements made,
- putting the winding fabric T under tension, by actuating the cylinders 5, 5' so as to move the plate 6 axially over the periphery P1 to which the winding fabric T is fixed, as depicted in FIG. 9.

Figure 10:
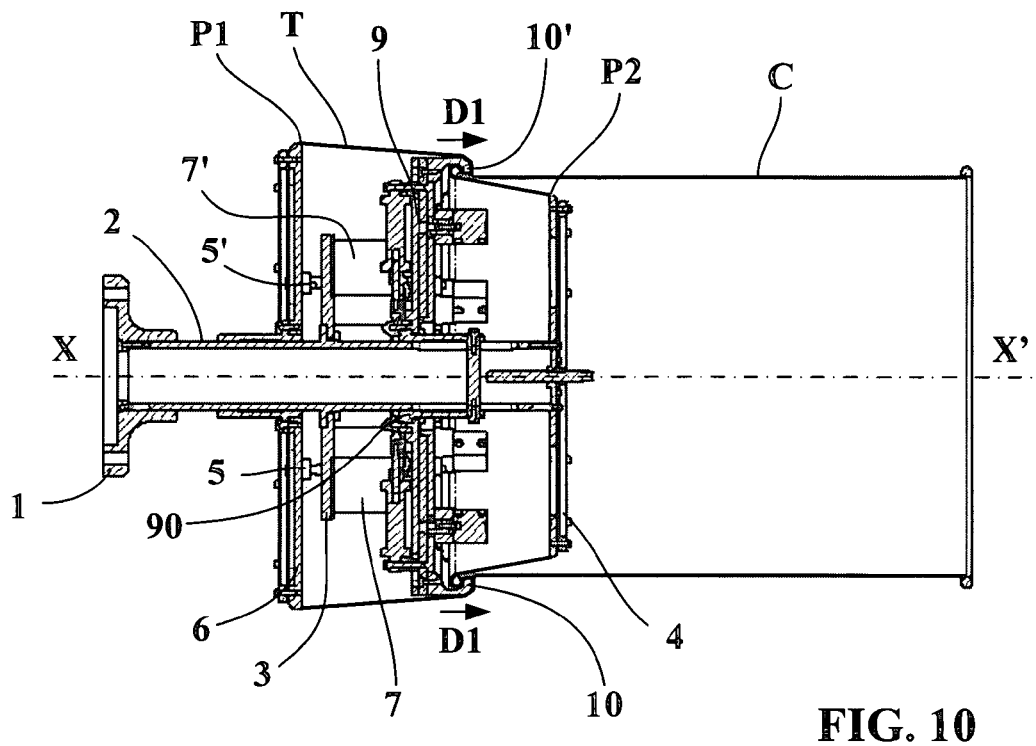

The winding operation proper then takes place and consists of:
- moving the set of winding heads 10, 10' axially (see FIG. 10) in an axial direction D1 directed towards the middle part of the cylindrical sleeve, by axially moving the plate 9 under the action of the cylinders 7, 7', so that the relative movement of the winding fabric T surrounding the toric ring R and the cylindrical sleeve C with respect to the concave annular surface 103 causes the winding of the end E of the cylindrical sleeve C around the toric ring R. The length of the cylindrical sleeve C wound around the toric ring R depends directly on the amplitude of the axial movement of the winding heads 10, 10'. The end E of the said cylindrical sleeve can be engaged between the toric ring R and the cylindrical sleeve C itself in order to make at least one complete turn of the said cylindrical sleeve C.

Figure 11:
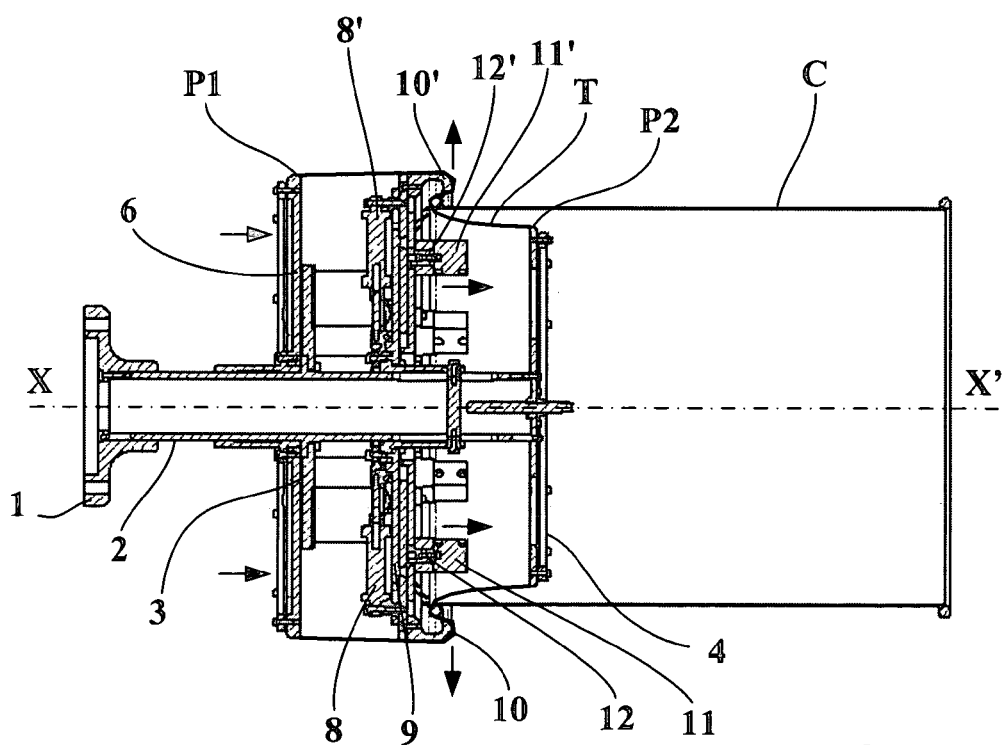

Once the winding of a first end is complete it is necessary to:
- release the tension on the winding fabric T by actuating the cylinders 5 and 5' and radially raising the set of winding heads 10, 10' by actuating the cylinders 8, 8' after having released the fingers 12, 12' and actuating the cylinders 11, 11', as depicted in FIG. 11,
- extract the cylindrical sleeve C wound around the toric ring R and if necessary introduce the end E of the axially opposite sleeve into the winding device in order to make it undergo the same operations.

In the case of a tire blank, the said blank still has to be completed on classical finishing means, and then the vulcanisation carried out in a mould so as to obtain a tire having the desired architecture.

The steps of producing the winding, as described previously, use several drums for producing the tire blank in order better to characterise the steps related to the production of the winding proper consisting of using the device according to the invention. However, it is entirely conceivable to integrate this device on existing methods by making the necessary adaptations for holding the cylindrical sleeve, comprising the carcass reinforcement and the toric rings of the bead, on the so-called building drum and bringing the winding device closer to the ends of the sleeve in order to proceed with the winding operation.

I claim:

1. A method of winding one end (E) of a cylindrical sleeve (C) of axis XX' around a toric ring (R) with an inside diameter substantially equal to that of the cylindrical sleeve (C), so that the end (E) of the cylindrical sleeve is engaged between the toric ring (R) and the cylindrical sleeve (C) itself in order to make at least one complete turn around a substantially circular radial section of the toric ring (R), wherein the method comprises the steps of:
    disposing in an open position a winding device (D) comprising a winding fabric (T) formed by a sleeve having two ends (P1, P2) fixed to two anchoring plates of different diameters, the winding fabric (T) being capable of sliding freely in an axial direction over an external surface of a concentric set of winding heads, the winding heads each having an external profile comprising a back surface defining a substantially cylindrical surface of axis XX', a convex front annular surface of axis XX' connected to the back surface, and a concave annular surface of axis XX' situated at a rear portion of the convex front annular surface and connected thereto, so that the winding fabric (T) forms S-shaped loops (B) when the winding fabric (T) substantially follows the external profile of the winding heads, by radially lifting the winding heads;
    introducing the tone ring (R) on the end (E) of the cylindrical sleeve (C) into an annular housing (L) formed by portions of the loops (B) and the winding fabric (T);
    radially lowering the set of winding heads concentrically so that the winding fabric (T) grips an assembly formed by the tone ring (R) and the cylindrical sleeve (C) over more than half of a circumference of said assembly;
    tensioning the winding fabric (T) along axis XX';
    moving the set of winding heads in an axial direction (D1) toward a middle part of the cylindrical sleeve (C), so that relative movement of the winding fabric (T) with respect to the concave annular surface causes the end (E) of the cylindrical sleeve (C) to be wound around the toric ring (R) so that the end (E) is engaged between the toric ring (R) and the cylindrical sleeve (C) itself to form at least one complete turn around the toric ring (R);
    releasing the tension on the winding fabric (T) and radially lifting the set of winding heads; and extracting the cylindrical sleeve (C) wound around the toric ring (R).

2. The method according to claim 1, in which the toric ring (R) comprises a toric reinforcement bead wire of a tire.

3. The method according to claim 1, in which the cylindrical sleeve (C) comprises a carcass reinforcement of a tire.

4. The method according to claim 1, in which an agent is introduced for reducing friction at the interface between the toric ring (R) and the cylindrical sleeve (C) so as to allow the sliding of the cylindrical sleeve (C) around the toric ring (R).

5. The method according to claim 4, in which the agent for reducing the friction is stearate.

6. The method according to claim 4, in which the agent for reducing friction comprises a sheath of thermoplastic material wound around the toric ring (R).

7. The method according to claim 4, in which the agent for reducing friction comprises a metallic or textile filament wound around the ring (R).

* * * * *